United States Patent [19]

Wang et al.

[11] Patent Number: 5,222,080
[45] Date of Patent: Jun. 22, 1993

[54] METHOD AND APPARATUS FOR SIGNAL RECONSTRUCTION

[75] Inventors: Yao Wang, Brooklyn, N.Y.; V. Ramamoorthy, St. Louis, Mo.

[73] Assignee: U S West Advanced Technologies, Inc., Boulder, Colo.

[21] Appl. No.: 673,238

[22] Filed: Mar. 20, 1991

[51] Int. Cl.$^5$ .......................... H03D 1/04; H04B 1/10; H04Q 11/04
[52] U.S. Cl. ...................................... 375/99; 375/102; 375/103; 370/54; 370/60; 370/94.1; 455/303; 455/306
[58] Field of Search ................. 375/99, 102, 103, 122; 370/16, 16.1, 54, 60, 94.1; 371/31, 65; 455/303, 305, 306

[56] References Cited

U.S. PATENT DOCUMENTS

| | | | |
|---|---|---|---|
| 4,100,377 | 7/1978 | Flanagan | 370/94.1 |
| 4,375,581 | 3/1983 | Jayant | 371/31 |
| 4,907,277 | 3/1990 | Callens et al. | 371/31 |

OTHER PUBLICATIONS

Martin Vetterli, "Multi-Dimensional Sub-Band Coding: Some Theory and Algorithms," *Signal Processing*, 6 (1984), pp. 97-112, North Holland.

Gunnar Karlsson and Martin Vetterli, "Packet Video and Its Integration into the Network Architecture", *IEEE Journal on Selected Areas in Communications*, vol. 7, No. 5 (Jun. 1989); pp. 739-751.

*Primary Examiner*—Curtis Kuntz
*Assistant Examiner*—Young Tse
*Attorney, Agent, or Firm*—Timothy R. Schulte

[57] ABSTRACT

A method for reconstructing an incomplete signal in a sub-band transmission system is disclosed. Signal degradation from signal loss in a sub-band transmission system may be avoided by formulating an error function, and finding an optimal signal which minimizes the error between the sub-band signals interpolated from received sub-band signals and the sub-band signals obtained by convolving an optimal reconstructed signal with the original analysis filters. The minimized system equation is solved to provide an optimal reconstructed output signal.

15 Claims, 5 Drawing Sheets

METHOD AND APPARATUS FOR SIGNAL RECONSTRUCTION

TECHNICAL AREA

The present invention relates in general to the reconstruction of signals and, more particularly, to a method and apparatus for signal reconstruction from incomplete sub-band signals in a sub-band transmission network.

BACKGROUND OF THE INVENTION

A "packet" is a discrete quantity of information used in the communication of data. The transmission of packets between users may be greatly enhanced by packet switching using a packet switched network. The concept of packet switching is based on the ability of modern, high-speed digital computers to manipulate information packets that are transmitted between such computers.

As shown in FIG. 1, in a typical prior art packet switched network 11, a plurality of nodes 13 are connected by communications lines 15. Each node contains a high-speed digital computer. Information sent from a transmitter 17 to a receiver 19 may travel over many different possible paths. Each path is a route of the packet over a plurality of communication lines 15. Typically, some communication lines 15 will be busier than others. Therefore, by dividing the information into packets, the nodes can efficiently use those communication lines which are readily available. For example, information "A B C D E", which is sent from the transmitter 17 to the receiver 19, is initially parsed into packets (the packets being the individual letters—"A", "B", "C", "D" and "E"). In this example, the packet size is one letter; however, the size of a packet may vary from one packet switched network to another. Within a particular packet switched network, all packets are the same size.

The packets are then transferred along differing paths. For example, the packet "C" is transmitted along a roundabout path which passes through six nodes before arrival at the receiver 19. In contrast, packet "E" is transmitted along a direct path passing through only three nodes. Each node 13 determines the most efficient path along which to transfer the packets. The receiver 19, after receiving the transmitted packets, recombines the packets to form the original transmitted information. The receiver uses information about the packets' size and identification, which may be included in the packets themselves, and a knowledge of the parsing scheme to perform the recombination.

Typically, the packets move around the packet switched network, from node to node, on a hold-and forward basis; each node, after receiving a packet, "holds" a copy of the packet in temporary storage until the node is sure that the packet has been received properly by the next node or by the end user. The copy of the packet is destroyed when the node is confident that the packet has been relayed successfully. The movement of the packets is called packet switching. By moving the packets through the network in nearly real time, the nodes can adapt their operation quickly in response to changing traffic patterns or failure of part of the network facility.

A packet switched network is characterized by several parameters. The first of these is packet size. As noted above, packet size may be through of as the amount of data carried within each packet. Another parameter which characterizes a packet switched network is the channel capacity of the network. The channel capacity may be defined as the maximum amount of information a particular communications line may handle or, in other words, the maximum number of packets which can be transferred over the communications line in a given time period. Channel capacity may be expressed as a bit rate capacity.

Using a packet switched network, communication resources may be efficiently used. Further, packet switching can be adapted to a wide range of user services. Presently, packet switching is used primarily in connection with computer and data communications. However, its effectiveness for voice, video and other wide-band telecommunication services has been demonstrated. As advanced data processing techniques improve the computer processors that form the nodes of packet switched networks, use of packet switched networks will undoubtedly become widespread.

However, packet switched networks also introduce some special problems in the communications area. One of the major obstacles of packet switched networks is the potential loss of packets. Packet loss can occur at the transmitter 17 if the number of packets generated is in excess of the transmission capacity, or at the receiver 19 if certain packets arrive after an exceptionally long delay. Moreover, packets can be lost within the network due to transmission impairment such as switch failure or transmission channel noise. Packet loss is particularly prevalent in video image transmissions. Typically, video images contain a much larger amount of information than other types of signals, such as audio signals. Therefore, video images must be transmitted at high densities which translate into high bit rates. Because of the high bit rates involved, packet loss occurs more frequently. Such loss may significantly affect the quality of video image transmissions.

One method that is used to avoid the loss of transmission quality, resulting from loss of packets, of a video image transmission is the use of a reliable source coding scheme. In order to guarantee transmission quality in a packet switched network, where packet loss is considered inevitable, source coding schemes should be designed in such a way that the distortion caused by packet loss is minimized, while the potential for recombining the original transmitted signal is maximized. Ideally, the source coding scheme at the transmitter and recombination at the receiver ought to be such that the original signal can be exactly recombined using the packets in the absence of quantization noise, transmission noise, and packet loss—the so-called "perfect reconstruction requirement."

Several methods of splitting a signal into packets exist which satisfy the perfect reconstruction requirement. One of these methods is the sub-band analysis/synthesis method. Conceptually, this source coding scheme consists of separating the original signal into different frequency components. Each separate frequency component is referred to as a sub-band signal. The separation of the original signal into sub-band signals is accomplished by inputting the signal into a number of analysis filters. The analysis filters output the sub-band signals. The sub-band signals are then transmitted as separate packets. The receiver, upon receipt of the packets, can form a reconstruction of the original signal by recombining the frequency components. This is typically done by the use of synthesis filters at the transmitter that are matched to the analysis filters at the transmitter. A system that uses this coding technique is referred to as a sub-band transmission network.

Because the loss of packets is considered inevitable, various missing packet recovery techniques have been suggested. These techniques may be divided into two groups: retransmission and reconstruction. A technique in the first group requests retransmission upon the detection of a lost packet. However, this technique will introduce random delay in the transmission and decrease transmission speed. A technique in the second group attempts to recover the lost packets based upon the characteristics of other correctly received packets. The success of the reconstruction relies upon the correlation between the lost packets and the received packets. Perfect reconstruction is unlikely unless the lost packets are completely correlated with the received packets. Correlation is a measure of the relatedness of two signals; for example, two successive frames in a video sequence will likely be well correlated.

The prior art as it relates to the reconstruction techniques consists primarily of simple substitution or interpolation. In these two methods the lost packets are replaced with or interpolated from the temporary or spatially adjacent received packets, respectively. The present invention addresses the problem of reconstruction in a manner that provides for a high-quality reconstruction. Further, the present invention provides a reliable method for information recovery in packet switched networks.

SUMMARY OF THE INVENTION

A method and apparatus for reconstructing an output signal which approximates an original transmitted signal are provided. In the present system, an original signal is decomposed into a set of m sub-band signals by a set of analysis filters, each with a known impulse response, and each sub-band signal is down-sampled (also referred to as decimated) by a factor of m. These decimated sub-signals are then quantized or coded, and transmitted. If all decimated sub-signals are received, the original signal can be reconstructed perfectly by a set of synthesis filters matched to the analysis filters. However, if some sub-signals are missing, for example, due to packet loss when the transmission is performed via a packet switched network, the perfect reconstruction is not possible. The present invention is a method and apparatus for constructing a signal from the received sub-band signals such that the error between the interpolated sub-band signals from the received sub-band signals and the sub-band signals obtained by convolving the reconstructed image with the original analysis filters is minimized.

In particular, the present invention identifies a signal $\hat{f}_{opt}(x,y)$ which minimizes the following error:

$$J(\hat{f}(x,y);(x,y) \in L) = \sum_{i \in B_r} w_i \sum_{(x,y) \in L} [\hat{f}(x,y) * h_i(x,y) - \hat{f}_i^B(x,y)]^2 \quad (1)$$

where i is the index identifying a particular sub-signal, $B_r$ is the set of indices for the received sub-band signals, L is the set of points where some sub-band signals are lost, $h_i(x,y)$ is the impulse response of the i-th analysis filter, $\hat{f}_i^B(x,y)$ is the interpolated sub-band signal from the received sub-band signals, modified at the boundary points inside set L according to the reconstructed values outside set L, and $w_i$ are weighting coefficients. In one embodiment, the interpolated sub-band signal is acquired by a simple averaging operation and $w_i$ is chosen to be one for all $i \in B_r$, and zero otherwise.

In accordance with other aspects of the present invention, the method is integrating into a packet switched network. Further, the set of sub-band signals are parsed into packets for transmission.

The present invention further includes apparatus for reconstructing a signal from a partial set of sub-band signals in a sub-band transmission system.

The method and apparatus of the present invention, when integrated into a sub-band transmission system, provides an efficient and accurate means for reconstructing original signals when at least one of the sub-band signals for the signal is received. The method and apparatus may be used in a system wherein the original signal is a two-dimensional video image.

DESCRIPTION OF THE PREFERRED EMBODIMENT

The present invention is generally described herein in terms of its application in a packet switched network. However, it is to be understood that the present invention has application in any transmission network capable of handling sub-band signal information. For example, microwave communications links, satellite communications links, and certain types of radio transmissions may incorporate the method and apparatus of the present invention.

Figure 1:
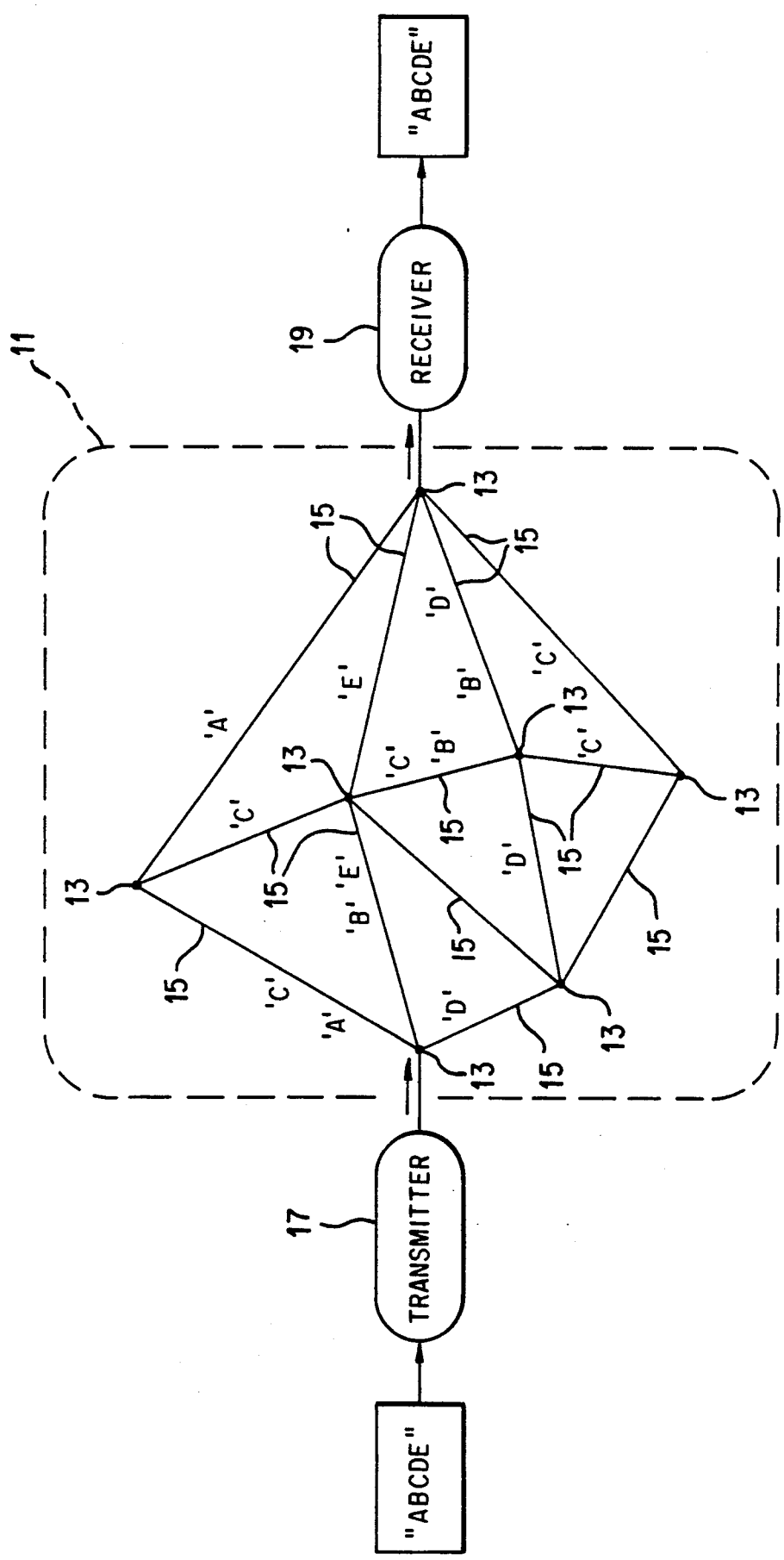
FIG. 1 is a schematic diagram of a prior art packet switched network.
Figure 2:
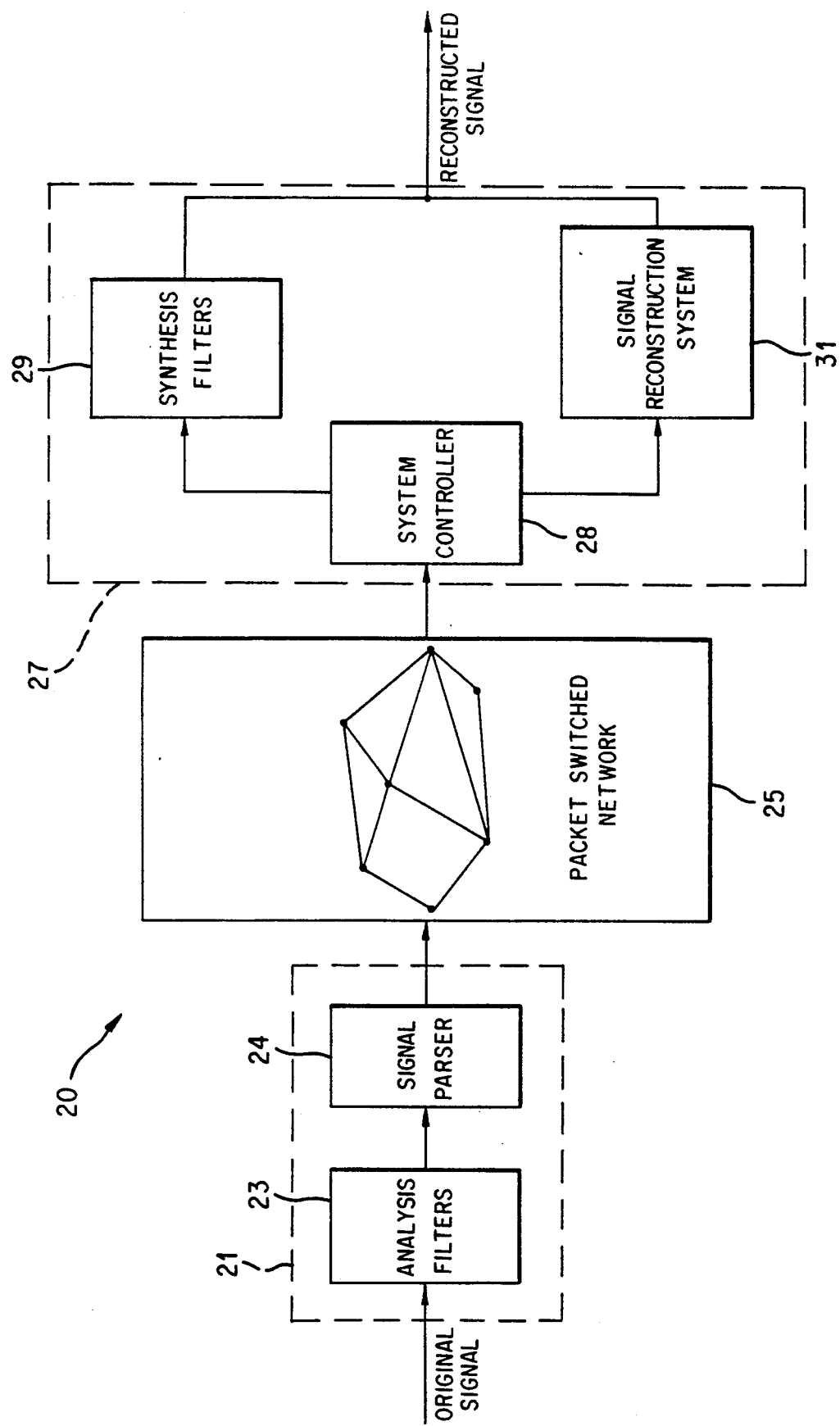
FIG. 2 is a block diagram of a sub-band transmission system incorporating a signal reconstruction system in accordance with the present invention.

With reference to FIG. 2, a system 20 for transmitting and receiving information over a packet switched network is shown. The system 20 includes a transmitter 21, a packet switched network 25 and a receiver 27. The transmitter 21 is comprised of a set of analysis filters 23 and a signal parser 24. The packet switched network 25, as described above, is schematically represented and receives the packets from transmitter 21. The receiver 27 comprises a system controller 28, synthesis filters 29, and a signal reconstruction system 31. The receiver receives the packets from network 25.

In operation, an original two-dimensional signal (e.g., a video image) is input into the transmitter 21. Next, the original two-dimensional signal is decomposed into a plurality of frequency components, also referred to as sub-band signals. This is preferably done by a set of analysis filters 23. The sub-band signals produced by the analysis filters 23 are decimated, quantized, and parsed into packets of a predetermined size by a signal parser 24. The packets are transmitted via the packet switched network 25. Receiver 27 collects the packets from the packet switched network 25. A determination is made by the system controller 28 as to whether all of the transmitted packets were received. If all packets were received, the set of synthesis filters 29 is sued to produce the output image. The set of synthesis filters 29 is matched to the set of analysis filters 23 which decomposed the original signal. This matching of the synthesis filters and the analysis filters allows a perfect reconstruction of the original signal of all of the transmitted packets are received.

However, if not all the packets are received, the output image is produced by a combination of the output from the synthesis filters 29 and from the signal reconstruction system 31. Specifically, as will be further explained below, the structure of the original two-dimensional signal is separated into "good segments" and "bad segments" by the system controller 28. A good segment is a signal segment for which all sub-band signals are received; a bad segment is a signal segment for which at least one but not all sub-band signals are received. The good segments are reconstructed using the synthesis filters 29. The bad segments are then reconstructed using the signal reconstruction system 31. Information from the synthesis filters 29 is provided to the signal reconstruction system 31. It will be seen below that certain boundary information is also needed by the signal reconstruction system 37. The reconstructed two-dimensional signal output by the signal reconstruction system 31 is the signal that minimizes the error equation:

$$J(\hat{f}(x,y);(x,y) \in L) = \sum_{i \in B_r} w_i \sum_{(x,y) \in L} [\hat{f}(x,y) * h_i(x,y) - \hat{f}_i^B(x,y)]^2 \quad (1)$$

where i is the index identifying a particular sub-signal, $B_r$ is the set of indices for the received sub-band signals, L is the set of points were some sub-band signals are lost, $h_i(x,y)$ is the impulse response of the i-th analysis filter, $\hat{f}_i^B(x,y)$ is the interpolated sub-band signal from the received sub-band signals, modified at the boundary points inside set L according to the reconstructed values outside set L, and $w_i$ are the weighting coefficients. In one embodiment, the interpolated sub-band signal is acquired by a simple averaging operation and $w_i$ is chosen to be one for all $i \in B_r$, and zero otherwise.

The reconstructed two-dimensional signal $\hat{f}(x, y)$ is iteratively calculated. The reconstructed two-dimensional signal which minimizes the error, Eq. (1), can be represented as $$\hat{f}_{opt} = R^{-1}p, \quad (2)$$

where:

$$R = \sum_{i \in B_r} w_i H_i^t H_i \quad (3)$$

$$p = \sum_{i \in B_r} w_i H_i^t \hat{f}_i^B \quad (4)$$

It is necessary that $B_r \neq 0$ for the system to operate. $H_i$ is the matrix which defines the impulse response of the $i^{th}$ analysis filter. The matrix $H_i$ is predetermined from the set of analysis filters used during the decomposition of the original signal. The operation of matrix transposition followed by complex conjugation is represented by t. The received interpolated sub-band signals in the $i^{th}$ sub-band are represented by $\hat{f}_i^B$. In one embodiment, the received interpolated sub-band signals are determined using a simple averaging procedure.

Following the reconstruction of the good and bad segments by the synthesis filters 29 and the reconstruction system 31, respectively, the segments are integrated to form a complete reconstructed output signal. If the system controller 28 identifies a segment for which no sub-band signals are received, that segment is not reconstructed. Thus, using the present invention, as long as at least one sub-band signal is received for any particular segment of an original signal and the segment is surrounded by good segments, the signal can be reconstructed. The more good segments and received sub-band signals that are available, the better the results from the reconstruction process will be.

As noted above, information transfer in a sub-band transmission system is accomplished by decomposing the original two-dimensional signal into a plurality of frequency components at the transmitter. By way of further explanation, the decomposition of the original signal into sub-band signals by the analysis filters 23 will next be more fully described. As is well known in the art, decomposition is the process of separating a signal into sub-band signals, each sub-band signal having a different frequency content, through the use of analysis filters. Each analysis filter can be characterized by its impulse response $h_i(x, y)$. The decomposition of the original two-dimensional signal is accomplished by having each analysis filter i produce an output which is the convolution of the original two-dimensional signal and the impulse response of the ith analysis filter. A detailed discussion of sub-band signal decomposition using analysis filters may be found in M. Vetterli, "Multi-Dimensional Sub-Band Coding: Some Theory and Algorithms," *Signal Processing*, 6:97–112, February 1984.

Figures 3A, 3B:
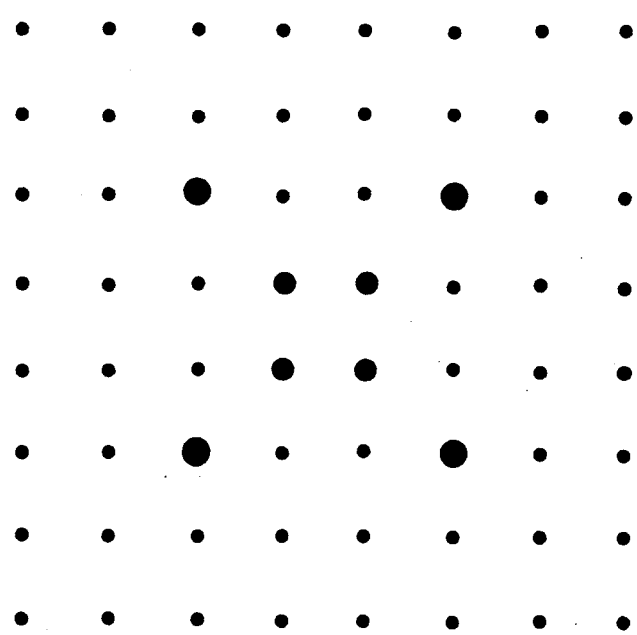
FIG. 3A is a graphical representation of an original two-dimensional signal.
FIG. 3B is a matrix representation of the two-dimensional signal of FIG. 3A.

With reference to FIGS. 3A and 3B, an original two-dimensional signal can be represented as spatial and matrix values, respectively. For example, if the original two-dimensional signal in FIG. 3A were a video image (in this case the image is an "X" centered in the image), each matrix value in FIG. 3B corresponds to a brightness value of a pixel in the video image. Further, the x-dimension of the video image corresponds to the row length, and the y-dimension corresponds to the column length of the matrix. In this particular original two-dimensional signal, the matrix is 8×8, which represents 64 total matrix values.

Figure 3C:
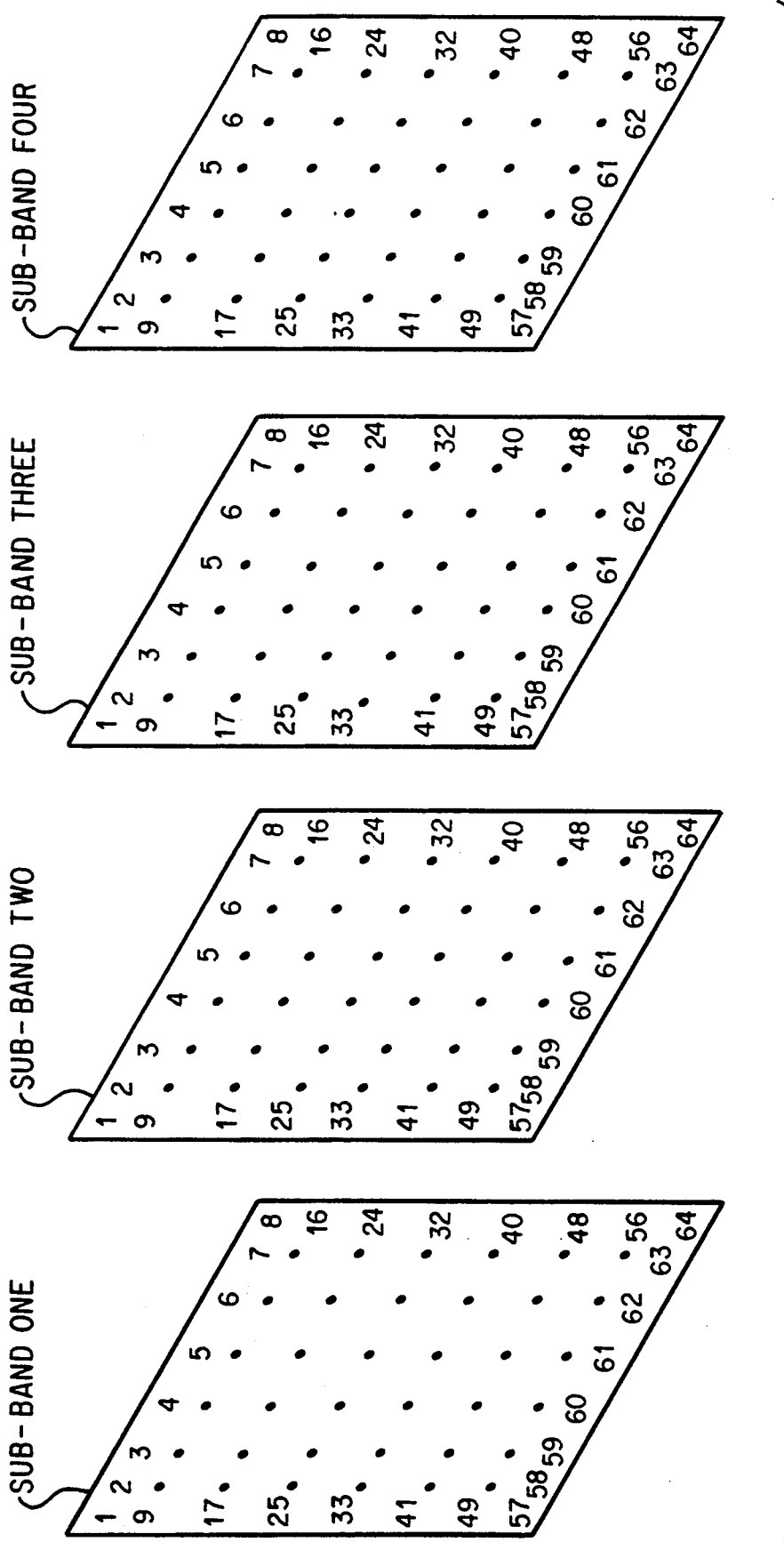
FIG. 3C is a matrix representation of the original two-dimensional signal of FIG. 3A decomposed into four sub-band signals.

Conceptually, the process of decomposition may be more clearly seen in conjunction with FIG. 3C. In this particular example, the original two-dimensional signal is decomposed into four sub-band signals by four analysis filters. The sub-band signals are denoted as sub-band signal one, sub-band signal two, sub-band signal three, and sub-band signal four. Like the matrix form of the original two-dimensional signal, each one of these sub-band signals is a matrix containing 64 separate values. In the present example, matrix value 1 for all four sub-band signals in FIG. 3C correspond to spatial location 1 in the original two-dimensional signal in FIG. 3A; the other matrix values similarly correspond.

Following the initial decomposition by the analysis filters 23, each sub-band signal is decimated, quantized, and parsed into packets of a predetermined size for the particular packet switched network. These steps are performed by the signal parser 24. In one actual embodiment, decimation is accomplished by taking every other sample in both the x-direction and the y-direction, such that each sub-band signal of 64 values is compressed into 16 values. Since there are four sub-bands, the total number of sub-band signals transmitted is still 64. By using a set of properly designed synthesis filters matched to the analysis filters, the original signal can be perfectly reconstructed from the decimated sub-band signals. A detailed description of a perfect reconstruction sub-band system may be found in R. E. Crochiere and L. R. Rabiner, *Mulitrate Digital Signal Processing*, Prentice Hall, Inc., 1983.

After decimation, the signals are quantized. Quantization refers to a number of method for reducing the number of information carrying units, usually measured by bits, that are required to represent the original signal. Any number of well-known quanitzation method can be performed.

The sub-band signals are then parsed into packets. For example, if the packet size is four matrix elements, each sub-band signal of 16 values is parsed into four separate packets. In a specific example, assuming that the packet size is four matrix elements, decimated values 1-4 could form a packet, values 5-8 another packet, etc. Each packet also includes information identifying the packet, e.g., sub-band signal number and matrix location.

Once decimation, quantization and parsing are completed, the packets are transmitted over the network 25. As noted earlier, if all the packets for a particular portion of the signal are received at the receiver 27, synthesis filters, which match the analysis filters, are used to recombine the sub-band signals into a perfect recombination of the original two-dimensional signal. This includes the known steps of decoding and expanding the signals. However, if a packet is lost in the transmission of a portion of the original signal, the signal reconstruction system 31 will act to reconstruct the lost portion of the original signal.

The system controller 28 checks the identity of the received packets and determines for which spatial location values in the original two-dimensional signal a complete set of packets (i.e., all of the four sub-band signals) are received. The original matrix space, e.g., 64 values in the present example, rather than the decimated space, will be referred to for ease of understanding. For example, assume that matrix values 1-8 of sub-band signal one are contained in a packet which is lost. Assuming that all other packets are received, the bulk of the original two-dimensional signal may be recombined without difficulty using the synthesis filters. Since all of the sub-band signals for matrix locations 9-64 are received, matrix values 9-64 are input to the synthesis filters 29 to form values for the spatial locations 9-64 of the original two-dimensional signal. The area of the original two-dimensional signal represented by matrix values 9-64 is referred to as a "good segment."

That portion of the original two-dimensional signal which is carried by matrix values 1-8 of sub-band signal one renders spatial locations 1-8 of the original two-dimensional signal not recombinable by the synthesis filters. This area of the original two-dimensional signal is referred to as a "bad segment." Attempts by the prior art to reconstruct bad segments involve the interpolation of the values using adjacent received values of a sub-band signal. For example, matrix values at locations 1-8 may be estimated using information from the reconstructed values at locations 9-16. Alternatively, the matrix values 1-8 may be interpolated in time by a simple averaging of previously transmitted matrix values 1-8. In contrast, the present invention reconstructs the matrix value in a bad segment by an error-minimization technique using the received matrix values (e.g., matrix values 1-8) of the other sub-band signals in addition to the good segment boundary matrix values.

Before proceeding with the detailed description, a definitions table which defines and illustrates the notation used herein is presented. Throughout the application:

| | |
|---|---|
| $h_i(x,y)$ | The impulse response of the analysis filter in the ith band. |
| $g_i(x, y)$ | The impulse response of the synthesis filter in the ith band |
| $f(x,y)$ | The original two-dimensional signal to be transmitted in the sub-band transmission network. |
| $f_i(x,y)$ | The output of the ith analysis filter acting upon the original two-dimensional signal. |
| $\tilde{f}_i(x,y)$ | $f_i(x,y)$ decimated by a factor of 4. |
| $\bar{f}_i(x,y)$ | $\tilde{f}_i(x, y)$, having a zero placed between each value, i.e., the zero padded signal. |
| $\hat{f}(x,y)$ | The reconstructed two-dimensional signal. |
| $\hat{f}_i{}^B(x,y)$ | $\bar{f}_i(x,y)$, having each zero replaced by an interpolated value, and modified at the boundary. |
| $Z_a$ | The set of integers from 1 to a, i.e., $Z_a \triangleq [1, 2, \ldots, a]$. |
| m | The dimension of the original two-dimensional signal in the x-direction. |
| n | The dimension of the original two-dimensional signal in the y-direction. |
| D | All points where $f(x, y)$ is defined, i.e., $D \triangleq [(m, n); m$ is an element of $Z_m$, n is an element of $Z_n]$. |
| L | The set of points defined on D where the reconstruction of the present invention is to be applied. |
| $B_r$ | The set of indices i for the received sub-band signals. |

Figure 4:
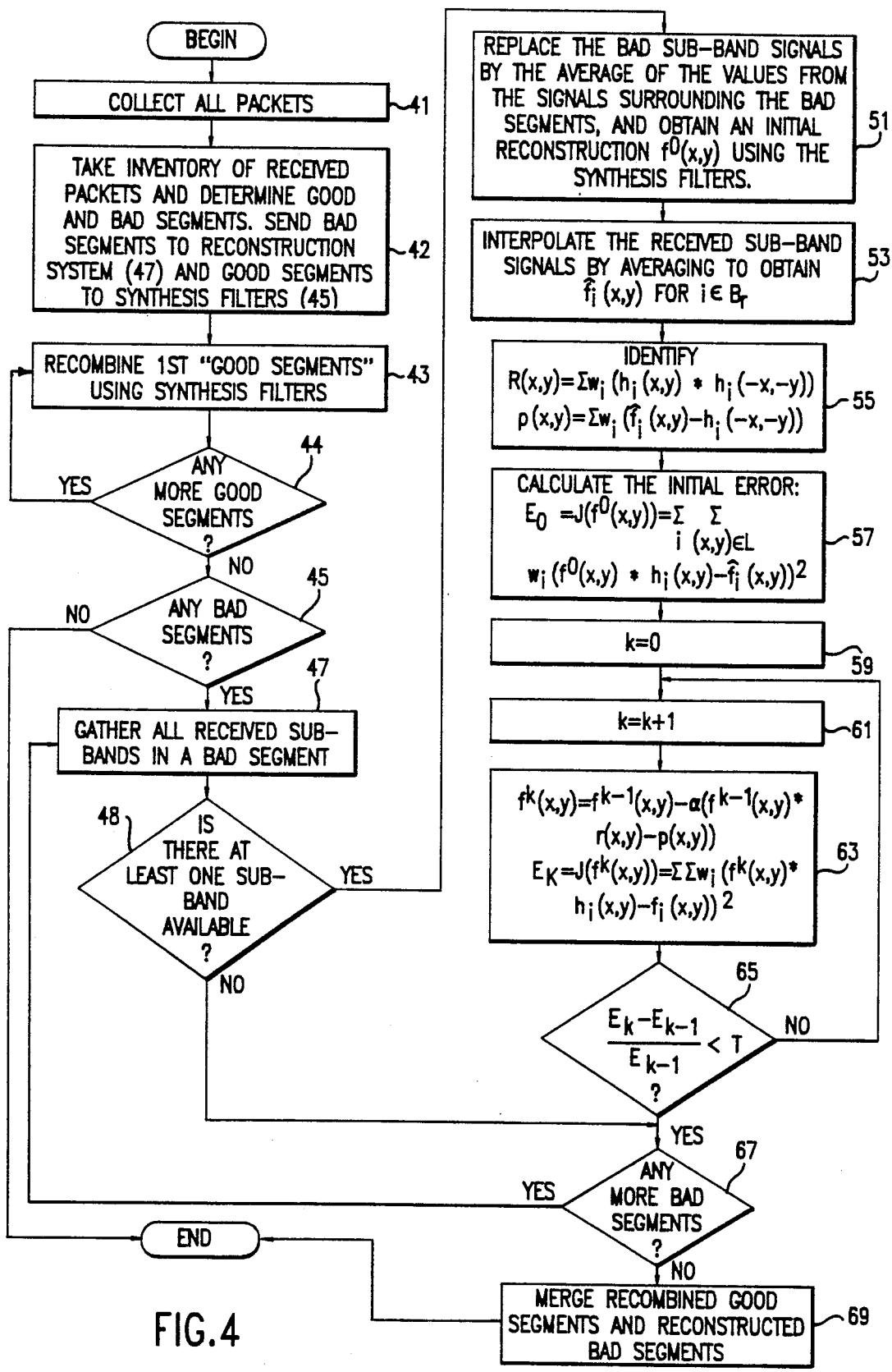
FIG. 4 is a flow diagram of a method for reconstructing an original transmitted signal in accordance with the present invention.

With reference to FIG. 4, in one preferred embodiment of the receiver 27, the receiver 27 collects the packets and the system controller 28 takes inventory of the packet at steps 41 and 42, the synthesis filters 29 recombines the good segments at steps 43-44, the signal reconstruction system 31 reconstructs the bad segments at steps 47-65, and the reconstructed segments are merged at step 69 to produce the complete output signal. In this manner, the reconstruction method of the present invention is incorporated into a system that can perform perfect reconstruction, as well as reconstruction using the signal reconstruction system 31 when all sub-band signals are not received.

The method is carried out by the receiver 27 after the packets have been sent over the network. At step 41, the receiver 27 collects all of the packets from the packet switched network. Next, at step 42, a determination is made by the system controller 28, for each spatial location of the original two-dimensional signal, whether all of the sub-band signal packets have been received. This determination can be accomplished by the system controller 28 using information contained in the packets. As noted above, in one embodiment, sub-band signal and matrix location identifying information is included within each packet. The packet information may also indicate the total number of sub-band signals and total number of packets transmitted.

If all of the sub-band signal packets have been received for a spatial location of the original two-dimensional signal, that portion of the original two-dimensional signal is a good segment. In the example described above, each spatial location is made up of eight matrix elements. It will be appreciated that for a particular original two-dimensional signal, there may be several good segments and several bad segments.

Each good segment is recombined using the matched synthesis filters 29 at step 43, a technique which is well known in the art. The recombination is performed for each good segment until all good segments have been recombined at step 44. In those spatial locations of the original two-dimensional signal for which not all of the sub-band signal packets are received, the reconstruction method of the present invention is utilized. At step 45, a check is made to determine whether any bad segments were received. If no bad segments are received, the reconstruction is completed; otherwise, the reconstruction method of the present invention is performed.

At step 47, all of the received sub-band signals in a bad segment of the original two-dimensional signal are gathered. In order for the reconstruction to be accomplished, at least one sub-band signal, e.g., matrix values 1–8 of sub-band signal two, for the spatial location must be received. At step 48, a check is made to determine whether at least one sub-band signal was received. If no sub-band signals were received for the spatial location, then the reconstruction of that bad segment is not performed. If that is the case, a check is then made at step 67 to determine whether other bad segments are to be reconstructed.

If, at step 48, at least one sub-band signal was received for the bad segment, an iterative process is used to find the optimal solution such that the error between the sub-band signal interpolated from the received sub-band signals, $f_i^B(x,y)$, and the sub-band signals obtained by convolving the reconstructed two-dimensional signal, $\bar{f}(x,y)$, by the original analysis filters, $h_i(x,y)$, is minimized. The error equation is:

$$J(\hat{f}(x,y);(x,y) \in L) = \sum_{i \in B_r} w_i \sum_{(x,y) \in L} [\hat{f}(x,y) * h_i(x,y) - \hat{f}_i^B(x,y)]^2 \quad (1)$$

where i is the index identifying a particular sub-band signal, $B_r$ is the set of indices for the received sub-band signals, L is the set of points where some sub-band signals are lost, $h_i(x,y)$ is the impulse response of the i-th filter, $\hat{f}_i^B(x,y)$ is the interpolated sub-band signal from the received sub-band signals, which are modified at the boundary points inside L according to the reconstructed values outside L, and $w_i$ are the weighting coefficients. In one preferred embodiment, $w_i$ is chosen to be one (1) for all i $\delta$ $B_r$ and zero (0) otherwise.

One actual method of minimizing the error in Equation (1) is a straight-forward gradient descent algorithm where gradient information is used to iteratively update the reconstructed signal. In this manner, the error is decreased after each iteration and the iterative process stops when the error no long significantly decreases. This method, although included herein, is known in the art and is included for purposes of clarity and completeness.

To begin, the gradient of the error function with respect to each $\hat{f}(x,y)$ is:

$$d\hat{f}(x, y) = \hat{f}(x, y) * r(x, y) - p(x, y) \quad (5)$$

where $$r(x, y) = \Sigma w_i (h_i(x, y) * h_i(-x, -y)) \quad (6)$$

is the weighted summation of the auto-correlation of the analysis filter in each band and $$p(x, y) = \Sigma w_i (\hat{f}_i^B(x, y) * h_i(-x, -y)) \quad (7)$$

is a constant function. r(x,y) and p(x,y) correspond to R and p in the matrix form.

The necessary and sufficient condition of $\hat{f}(x,y)$ to be the optimal estimate is $$d\hat{f}(x,y) = 0 \text{ for } (x, y) \in L \quad (8)$$

Next, iterative method assumes values for the reconstructed two-dimensional signal, $\hat{f}(x,y)$. The initial try at a reconstructed two-dimensional signal will be called $\hat{f}^0(x,y)$. As the iterative method proceeds, it will be appreciated that $\hat{f}^0(x,y)$ will slowly transform into the finished reconstructed two-dimensional signal, $\hat{f}_{opt}$. The choice of $\hat{f}^0(x,y)$ is somewhat arbitrary, since the iterative method will converge to the final signal irrespective of $\hat{f}^0(x,y)$. However, in the preferred embodiment, $\hat{f}^0(x,y)$ is obtained by inputting into the synthesis filters the received sub-band signals, $\hat{f}_i^B(x,y)$, and for the lost sub-band signal, the average of the values from a boundary of the bad segment. For example, if sub-band one of matrix values 1–8 is lost, sub-band one for purposes of defining $\hat{f}^0(x,y)$ will be the average of all of the sub-bands for matrix values surrounding matrix values 1–8, i.e., matrix values 9–16. Thus, at box 51, $\hat{f}^0(x,y)$ can be determined and the method continues at step 53.

At step 53, the received sub-band signals are interpolated by averaging to obtain $\hat{f}_i^B(x,y)$ for i $\delta$ $B_r$. At step 55, r(x,y) and p(x,y) are identified using Equations (6) and (7). At step 57, an initial error $E_0$ is calculated according to Equation (1).

$$E_0 = J(\hat{f}^0(x,y)) = \sum_{i \in B_r} w_i \sum_{(x,y) \in L} [(\hat{f}^0(x,y) * h_i(x,y) - \hat{f}_i^B(x,y)]^2 \quad (9)$$

At step 59, an iteration index k is set to zero. The iterative process is carried out as described in relation to steps 61–65.

At step 61, the iteration index k is incremented. At step 63, if $f^{k-1}(x,y)$ represents the iteration result at the (k−1)iteration, then at the next iteration $$\hat{f}^k(x,y) = \hat{f}^{k-1}(x,y) - \alpha(\hat{f}^{k-1}(x,y) * r(x,y) - p(x,y))$$
$$\hat{f}^k(x,y) = \tau(\hat{f}^k(x,y)) \text{ for } (x,y) \in L \quad (10)$$

where $\tau(f)$ is a nonlinear threshold function:

$$\tau(f) = f_{min} \text{ if } f < f_{min} \quad (11)$$
$$f \text{ if } f_{min} \leq f \leq f_{max}$$
$$f_{max} \text{ if } f > f_{max}$$

$\tau$ is imposed due to the limited dynamic range of the original signal. The error $E_k$ is then:

$$J(\hat{f}^k(x,y)) = \sum_{i \in B_r} \sum_{(x,y) \in L} w_i [\hat{f}^k(x,y) * h_i(x,y) - \hat{f}_i^B(x,y)]^2$$

At step 65, the convergence of the error E is checked. Generally, a threshold value T is chosen to achieve an acceptable error value, i.e., the error is minimized and did not significantly decrease during the last iteration.

The proportional change between $E_k$ and $E_{k-1}$ is considered. If the change in the error is not small enough, a further iteration is performed beginning at step 61. Using this method, $f_{opt}$ is estimated in a straightforward manner.

If the change in the error is small enough, at step 67 the system checks to determine whether there are further bad segments to be considered. If there are, the system returns to step 47. If there are no further bad segments, at step 69 a complete reconstructed output signal is obtained by merging the output of the synthesis filters with the output of the signal reconstruction system to produce the final reconstructed output signal.

There exist many other gradient descent algorithms. Among them, one often used for the quadratic optimization problem is the conjugate gradient descent algorithm. This is well known in the art and is described in detail in D. G. Luenberger, *Linear and Non-Linear Programming*, Addison-Wesley, 2d Ed., 1984. With this algorithm, the optimal can be achieved within at most N iteration, where N is the number of lost samples. In practice, it usually takes much less than N iterations, depending on the eigenvalue spread of the system matrix R.

In the particular example described above, each bad segment comprised a set of eight matrix values. However, the present invention can reconstruct a bad segment that includes any number of spatial location values. This is because the reconstruction does not depend on the shape and the size of the bad segments. Thus, using the signal reconstruction system, any bad segment for which some sub-band signal information is received can be efficiently and accurately reconstructed.

MATHEMATICAL DERIVATION OF THE PREFERRED EMBODIMENT

In order to aid in the understanding of the present invention, the mathematical derivation for Equation (2) is next described. It is to be understood that the derivation is not necessarily performed during the reconstruction process. Rather, Equation (2) is solved or estimated during the reconstruction process.

The process begins with signal decomposition where the original signal is decomposed into m subsignals. In one actual embodiment, the system decomposes the original two-dimensional signal into four sub-band signals; therefore m is equal to four in this embodiment. However, it can be appreciated that the signal may be decomposed into more sub-band signals. As noted earlier, $h_i(x, y)$ is the original two-dimensional signal, then the ith sub-band signal $f_i(x, y)$ is stated as:

$$f_i(x, y) = f(x, y) * h_i(x, y) \qquad (12)$$

In other words, $f_i(x, y)$ is the convolution of the original two-dimensional signal and the impulse response of the ith analysis filter.

The output $f_i(x, y)$ of the analysis filters is decimated by a factor of two in both x and y dimensions. This typically can be accomplished by extracting from $f_i(x, y)$ every alternate sample. In mathematical notation:

$$\bar{f}_i(x, y) = f_i(2x, 2y) \text{ for } (2x, 2y) \in D \qquad (13)$$

Decimation is a well-known procedure in the prior art and is used as a method of compressing a signal in order to save transmission time. Next, the decimated output $\bar{f}_i(x, y)$ is quantized and parsed into packets for transmission in the packet switched network 25. The receiver 27 receives the packets and the process of recombination/reconstruction is accomplished.

The perfect reconstruction synthesis filters may be readily obtained from information defining the analysis filters. The theory of sub-band signal decomposition and the use of analysis filters and synthesis filters to obtain perfect reconstruction is known in the art. A detailed discussion of this may be found in P. P. Vaidyanathan, "Theory and Design of M-Channel Maximally Decimated Quadrature Mirror Filters With Arbitrary M, Having the Perfect Reconstruction Property," *IEEE Transaction on Acoustics, Speech, and Signal Processing*, ASSP-35(4):476–492, April 1987, and also in M. Vetterli and D. LeGall, "Perfect Reconstruction FIR Filter Banks: Some Properties and Factorizations," *IEEE Transaction on Acoustics, Speech, and Signal Processing*, ASSP-37(7):1057–1071, July 1989.

An example of one such reconstruction using synthesis filters is as follows: First, the received decimated signals are padded with zeros such that:

$$\tilde{f}_i(x,y) = \bar{f}_i\left(\frac{x}{2}, \frac{y}{2}\right) \text{ for } x \text{ and } y \text{ both even} \qquad (14)$$
$$\phantom{\tilde{f}_i(x,y)} = 0 \qquad \text{all other } x \text{ and } y$$

where $\tilde{f}_i(x, y)$ is the zero-padded decimated signal. Thus, $\tilde{f}_i(x, y)$ comprises the transmitted decimated signal $\bar{f}_i(x, y)$ alternately interspersed with zeros. The two-dimensional output signal $\hat{f}(x, y)$ is recombined from $\tilde{f}_i(x, y)$ by using the corresponding synthesis filter in each band:

$$\hat{f}(x,y) = \sum_{i=1}^{4} \tilde{f}_i(x,y) * g_i(x,y) \qquad (15)$$

where $g_i(x, y)$ are the impulse responses of the synthesis filters. The filters $h_i(x, y)$ and $g_i(x, y)$ are designated in such a way such that the aliasing components in each band due to zero filling are cancelled. It can be appreciated that if no numerical errors are involved in the filtering operation and no quantization and channel noise existed in the coding and transmission process, $\hat{f}(x, y)$ is an exact replica of $f(x, y)$, except for some spatial shift.

If the received packets are complete, i.e., none of the packets are lost, synthesis filters may be used as described above to recombine the original two-dimensional signal without difficulty. However, if packets are lost, recombination of the original signal may pose difficulties. The receiver 27 uses the reconstruction method of the reconstruction system 31 to reconstruct the original two-dimensional signal.

The specific derivation for Equation (2) is as follows. The set L is defined on set D to be all of the points in a bad segment, and $B_r$ is the set of indices of the received decimated sub-band signals. In the example used earlier with reference to FIGS. 3A and 3B, a bad segment might be spatial locations 1–8 in the original two-dimensional image. Further, it is necessary that $B_r \neq 0$, i.e., at least one sub-band signal in the bad segment must have been received. If the reconstructed output signal is represented by $\hat{f}(x, y)$ and the received zero padded sub-band signals are represented by $\tilde{f}_i(x, y)$, one requirement for an optimal reconstruction of the original two-dimensional signal is that the reconstructed output signal $\hat{f}(x, y)$, decomposed by the analysis filters $h_i(x, y)$, results in the same values at those points where the sub-band signals are received. This is represented by:

$$\hat{f}(x, y) * h_i(x, y) = \widetilde{f_i}(x, y), \text{ for } (x, y) \in \widetilde{L}, i \in B_r \quad (16)$$

where
$$\widetilde{L} = \{(x, y); x = 2m, y = 2n, (2m, 2n) \in L\} \quad (17)$$

However, because $\widetilde{f_i}(x, y)$ is the zero-padded decimated signal and various values are unavailable because of lost packets, it has been proven that there are an infinite number of solutions for $\hat{f}(x, y)$ which satisfy Equation (6). Thus, another constraint must be added in order to obtain a unique solution. To do this, the zeros present in $\widetilde{f_i}(x, y)$ are replaced with interpolated values. Many different types of interpolation processes may be used. In one actual embodiment, a simple average of the adjacent values to each zero is used. The optimization equation becomes:

$$\hat{f}(x, y) * h_i(x, y) = \hat{f}_i(x, y), \text{ for } (x, y) \in L \widetilde{L}, i \in B_r \quad (18)$$

where $\hat{f}_i(x, y)$ contains the interpolated values of $\widetilde{f_i}(s, y)$ at points which are not preset in the received decimated sub-band signals.

The convolution of $\hat{f}(x, y)$ with $h_i(x,y)$ for $(x,y)$ within set L requires the values of $\hat{f}(x,y)$ for $(x,y)$ outside set L. These values are known from the previous reconstruction of adjacent good segments. In order to simplify the rotation, it is assumed that $\hat{f}(x,y) = 0$ for all $(x,y)$ not in set L and $\hat{f}(x,y)$ is modified to take into account the boundary information. The modified $\hat{f}_i(x,y)$ is designated as $\hat{f}_i^B(x,y)$. The detailed derivation of $\hat{f}_i^B(x,y)$ is omitted here.

Equations (17) and (18) may be combined into one unified requirement, viz., $$\hat{f}(x, y) * h_i(x, y) = \hat{f}_i^B(x, y), \text{ for } (x, y) \in L, i \in B_r \quad (19)$$

Equation (19) constitutes a linear system with more equations than unknowns if more than one sub-band is available. Hence, a solution may not exist. But a solution may be found that minimizes the following square error:

$$J(\hat{f}(x,y);(x,y) \in L) = \sum_{i=1}^{4} \sum_{(x,y) \in L} w_i(\hat{f}(x,y) * h_i(x,y) - \hat{f}_i(x,y))^2 \quad (20)$$

where $w_i$ is a weighting coefficient which, in this particular embodiment, is chosen to be one for all $i \in B_4$ and zero otherwise. In other words, the error function is the sum of the squares of the errors between all sub-band signals which were received and/or interpolated and the convolution of the reconstructed two-dimensional output signal with the analysis filters. This equation may be recast in a simpler matrix form:

$$J(\hat{f}) = \sum_{i \in B_r} w_i(H_i\hat{f} - \hat{f}_i^B)^t(H_i\hat{f} - \hat{f}_i^B) \quad (21)$$

where $H_i$ is a square matrix, determined from the analysis filter $h_i(x, y)$, and t represents the transposition of the matrix followed by complex conjugation. the determination of $H_i$ from the analysis filter impulse response $h_i(x, y)$ is well known in the art and a detailed discussion may be found in A. K. Jain, *Fundamentals of Digital Image Processing*, Prentice Hall, 1989. The matrix $\hat{f}$ is defined as:

$$\hat{f} \triangleq [\hat{f}(m_0, n_0) \hat{f}(m_1, n_1) \ldots \hat{f}(m_{n_L-1}, n_{n_L-1})]^T \quad (22)$$

where $n_L$ is the number of points in a bad segment and $(m_i, n_i)$ is the $i^{th}$ point in the set of reconstruction points L.

Similarly, $\hat{f}_i$ is the matrix defined as:

$$\hat{f}_i \triangleq [\hat{f}_i^B(m_0, n_0) \hat{f}_i^B(m_1, n_1) \ldots \hat{f}_i^B(m_{n_L-1}, n_{n_L-1})]^T. \quad (23)$$

The error function $J(\hat{f})$ is a non-negative quadratic function and hence a differentiable convex function. From classical optimization theory, $J(\hat{f})$ has one and only one minimum and this minimal point is located where the gradient vanishes. That is, the optimal estimate $\hat{f}_{opt}$ satisfies:

$$d\hat{f}_{opt} = 2 \left( \sum_{i \in B_r} w_i H_i^t(H_i\hat{f}_{opt} - \hat{f}_i^B) \right) = 2(R\hat{f}_{opt} - p) = 0 \quad (24)$$

or:

$$\hat{f}_{opt} = R^{-1}p \quad (2)$$

where:

$$R = \sum_{i \in B_r} w_i H_i^t H_i \quad (3)$$

$$p = \sum_{i \in B_r} w_i H_i^t \hat{f}_i^B \quad (4)$$

While a preferred embodiment of the invention has been illustrated and described, it will be appreciated that various changes can be made therein without departing from the spirit and scope of the invention. For example, although the present invention has been detailed in conjunction with a packet switched network, the invention operates equally well in any sub-band signal coding system where signal loss of a sub-band signal is possible.

The embodiments of the invention in which an exclusive property or privilege is claimed are defined as follows:

1. A method of constructing an output signal approximating an original signal from a set of sub-band signals, said method using a system having a system controller, a signal reconstruction system, and synthesis filters, wherein the set of sub-band signals is produced by inputting the original signal into a set of analysis filters, each of the filters having a known impulse response, and decimating the output from the set of analysis filters to produce the set of sub-band signals, wherein said original signal has a good segment and a bad segment, said good segment being a portion of the original signal where all sub-band signals in the set of sub-band signals are received by said system, said bad segment being a portion of the original signal where the set of sub-band signals is incomplete, the method comprising the steps of:

(a) constructing a good region of an output signal corresponding to the good segment by inputting the sub-band signals of said good segment into said synthesis filters which are matched to the analysis filters; and (b) constructing a bad region of said output signal corresponding to the bad segment by:
  (i) receiving at least one sub-band signal from the set of sub-bands signals in said bad segment; and (ii) identifying an output signal $$f_{opt} = R^{-1}p$$
where $$R = \sum_{i \in B_r} w_i H_i^t H_i$$

$$p = \sum_{i \in B_r} w_i H_i^t f_i^B$$

where i is the index identifying said received sub-band signals, $B_r$ are the indices of the received sub-band signals. $H_i$ is a matrix defining the impulse response of the analysis filters, $w_i$ are weighting coefficients, t is the operation of matrix transposition followed by complex conjugation, and $f_i^B$ are the interpolated received sub-band signals, whereby $f_{opt}$ is said output signal; and (c) combining the good region of said output signal with the bad region of said output signal to form a complete output signal.

2. The method of claim 1, wherein the weighting coefficients $w_i$ are equal to one (1) for the received sub-band signals and zero (0) for all other sub-band signals.

3. The method of claim 1, further including the step of transmitting the set of sub-band signals over a transmission network prior to receiving the set of sub-band signals by said system.

4. The method of claim 1, further including the step of parsing said sub-band signals into packets, and wherein the transmission network is a packet switched network.

5. The method of claim 1, wherein the original signal is a two-dimensional video image.

6. The method of claim 1, further including the step of interpolating the received sub-band signals $f_i$ by averaging the received sub-band signals.

7. The method of claim 1, wherein $f_{opt}$ is found by a gradient descent method by iteratively updating variable $f_k(x,y)$ by $$f^{k+1} = f^k(x,y) - ad f^k(x,y)$$
$$= f^k(x,y) - \alpha(f^k(x,y)*r(x,y) - p(x,y))$$

$$f^{k+1}(x,y) = \tau(f^{k+1}(x,y))$$

for $(x,y) \in L$ where $\tau(f)$ is a nonlinear threshold function:

$$\tau(f) = f_{min} \text{ if } f < f_{min}$$
$$f \text{ if } f_{min} \leq f \leq f_{max}$$
$$f_{max} \text{ if } f > f_{max}.$$

8. A receiver for constructing an output signal which approximates an original signal from a set of sub-band signals, said set of sub-band signals produced by inputting the original signal into a set of analysis filters and decimated, each analysis filter having a known impulse response, the set of sub-band signals being transmitted over a packet switched network to the receiver, the original signal having a good segment and a bad segment, the good segment being a portion of the original signal of which the receiver receives all sub-band signals of the set, the bad segment being a portion of the original signal of which the receiver receives at least one of the sub-band signals from the set of sub-band signals, the receiver including:

(a) means for determining the portions of the original signal which are good segments and bad segments;

(b) means for constructing a good region of an output signal corresponding to a good segment by inputting said good segment into a set of synthesis filters matched to the analysis filters;

(c) means for constructing a bad region of said output signal corresponding to a bad segment by identifying an output signal $$f_{opt} = R^{-1}p$$
where $$R = \sum_{i \in B_r} w_i H_i^t H_i$$

$$p = \sum_{i \in B_r} w_i H_i^t f_i^B$$

where i is the index identifying said received sub-band signals, $B_r$ are the indices of the received sub-band signals, $H_i$ is a matrix defining the impulse response of the analysis filters, $w_i$ are weighting coefficients, t is the operation of matrix transposition followed by complex conjugation, and $f_i^B$ are the interpolated received sub-band signals, whereby $f_{opt}$ is said output signal; and (d) combining said good region of said output signal with said bad region of said output signal to form a complete output signal.

9. The apparatus of claim 8, wherein the weighting coefficients $w_i$ are equal to one (1) for the received sub-band signals and zero (0) for all other sub-band signals.

10. The apparatus of claim 8, further including a transmission network for transmitting the set of sub-band signals to the receiver.

11. The apparatus of claim 8, wherein said transmission network is a packet switched network, said apparatus further including parsing means for parsing said sub-band signals into packets.

12. The apparatus of claim 11, wherein the original signal is a two-dimensional video image.

13. A method of constructing an output signal approximating an original signal from a set of sub-band signals, said method using a system having a system controller, a signal reconstruction system, and synthesis filters, wherein the set of sub-band signals is produced by inputting the original signal into a set of analysis filters, each of the filters having a known impulse response, and decimating the output from the set of analysis filters to produce the set of sub-band signals, wherein said original signal has a good segment and a bad segment, said good segment being a portion of the original signal where all sub-band signals in the set of sub-band signals are received by said system, said bad segment being a portion of the original signal where the set of sub-band signals is incomplete, the method comprising the steps of:

(a) constructing a good region of an output signal corresponding to the good segment by inputting the sub-band signals of said good segment into said synthesis filters which are matched to the analysis filters; and (b) constructing a bad region of said output signal corresponding to the bad segment by:
  (i) receiving at least one sub-band signal from the set of sub-band signals in said bad segment; and
  (ii) identifying an output signal $f_{opt}(x,y)$ which minimizes the following error:

$$J(f(x,y);(x,y) \in L) = \sum_{i \in B_r} w_i \sum_{(x,y) \in L} [f(x,y) * h_i(x,y) - f_i^B(x,y)]^2$$

where i is the index identifying a sub-signal, $B_r$ is a set of indices for said received sub-band signals, L is a set of points in said bad segment, $h_i(x,y)$ is an impulse response to an i-th analysis filter, $f_i^B(x,y)$ is an interpolated sub-band signal from said received sub-band signals, modified at boundary points of set L in accordance with said good region, and $w_i$ are weighting coefficients.

14. The method of claim 13, wherein said interpolated sub-band signal is acquired by an averaging operation.

15. The method of claim 13, wherein $w_i$ is chosen to be one for all $i \in B_r$, and zero otherwise.

* * * * *